United States Patent
Lee et al.

(10) Patent No.: US 9,616,767 B2
(45) Date of Patent: Apr. 11, 2017

(54) SYSTEM AND METHOD FOR POWER DISTRIBUTION OF FUEL CELL HYBRID VEHICLE

(71) Applicant: Hyundai Motor Company, Seoul (KR)

(72) Inventors: Kyu Il Lee, Gyeonggi-do (KR); Jae Won Jung, Seoul (KR); Sung Gone Yoon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 193 days.

(21) Appl. No.: 14/708,321

(22) Filed: May 11, 2015

(65) Prior Publication Data

US 2016/0144738 A1  May 26, 2016

(30) Foreign Application Priority Data

Nov. 20, 2014 (KR) .................. 10-2014-0162899

(51) Int. Cl.

| | | |
|---|---|---|
| *H01M 10/44* | (2006.01) | |
| *H01M 10/46* | (2006.01) | |
| *B60L 11/18* | (2006.01) | |
| *H01M 16/00* | (2006.01) | |
| *H01M 8/04828* | (2016.01) | |
| *H01M 8/04537* | (2016.01) | |

(52) U.S. Cl.
CPC ..... *B60L 11/1883* (2013.01); *H01M 8/04559* (2013.01); *H01M 8/04589* (2013.01); *H01M 8/04947* (2013.01); *H01M 16/006* (2013.01); *H01M 2250/20* (2013.01); *Y02T 90/32* (2013.01)

(58) Field of Classification Search
CPC ............. B60L 11/1883; H01M 16/006; H01M 2250/20; H01M 8/04559; H01M 8/04589; H01M 8/04947; Y02T 90/32
See application file for complete search history.

(56) References Cited

U.S. PATENT DOCUMENTS

| | | | | |
|---|---|---|---|---|
| 2010/0248053 A1* | 9/2010 | Umayahara | ....... | H01M 8/04559 429/432 |
| 2011/0266994 A1* | 11/2011 | Shimura | ........... | H01M 8/04186 320/101 |
| 2013/0175972 A1* | 7/2013 | Akiyama | ............ | H01M 8/0494 320/101 |
| 2015/0021992 A1* | 1/2015 | Toya | ................. | H01M 8/04619 307/25 |

FOREIGN PATENT DOCUMENTS

| | | |
|---|---|---|
| JP | 2009-176491 A | 8/2009 |
| JP | 2009-283471 A | 12/2009 |
| JP | 2010-158102 A | 7/2010 |

(Continued)

*Primary Examiner* — Vuthe Siek
(74) *Attorney, Agent, or Firm* — Mintz Levin Cohn Ferris Glovsky and Popeo, P.C.; Peter F. Corless

(57) ABSTRACT

A system and method for power distribution of a fuel cell hybrid vehicle are provided. The method includes measuring current-voltage performance of a fuel cell and determining a deterioration state of the fuel cell based on the current-voltage performance of the fuel cell. After the deterioration state is determined a battery charging timing, a battery assist quantity, a battery charging quantity, and battery assist timing are variably adjusted based on the deterioration state of the fuel cell.

14 Claims, 3 Drawing Sheets

(56) References Cited

FOREIGN PATENT DOCUMENTS

| | | | |
|---|---|---|---|
| JP | 5340484 | B2 | 11/2013 |
| JP | 5427832 | B2 | 2/2014 |
| JP | 2014-079066 | A | 5/2014 |
| JP | 2014-197508 | A | 10/2014 |
| KR | 10-0872648 | B1 | 12/2008 |
| KR | 10-2012-0014301 | A | 2/2012 |

* cited by examiner

SYSTEM AND METHOD FOR POWER DISTRIBUTION OF FUEL CELL HYBRID VEHICLE

CROSS REFERENCE TO RELATED APPLICATION

The present application claims priority of Korean Patent Application Number 10-2014-0162899 filed on Nov. 20, 2014, the entire contents of which application are incorporated herein for all purposes by this reference.

BACKGROUND

1. Technical Field

The present invention relates to a system and method for power distribution to realize a desired acceleration performance by adjusting battery compensation logic based on a deterioration state of a fuel cell of a fuel cell hybrid vehicle.

2. Description of the Related Art

A fuel cell vehicle is driven by a motor using power of a fuel cell. In an early stage of production, the fuel cell has high current-voltage performance to obtain a desired acceleration performance (e.g., an acceleration intention). However, the fuel cell deteriorates due to external environment, driving conditions, and the like over time. As a result, the current-voltage performance is reduced with the increase in deterioration, and thus a low current is generated at the same voltage and low output is generated. Since the low current is generated at the same voltage, when the existing power distribution logic is used, the deterioration of the fuel cell is increased and thus a driver may not obtain the same acceleration performance and a driving sense may be different depending on the deterioration of the fuel cell.

The matters described as the related art have been provided merely for assisting in the understanding for the background of the present invention and should not be considered as corresponding to the related art known to those skilled in the art.

SUMMARY

An object of the present invention is to provide a system and method for power distribution of a fuel cell hybrid vehicle capable of realizing a desired acceleration performance by performing power compensation of a fuel cell based on a deterioration state of the fuel cell in a fuel cell vehicle even though the deterioration of the fuel cell occurs.

According to an exemplary embodiment of the present invention, a method for power distribution of a fuel cell hybrid vehicle may include: measuring current-voltage performance of a fuel cell; determining a deterioration state of the fuel cell based on the current-voltage performance of the fuel cell; and after performing the determination, variably adjusting battery charging timing, a battery assist quantity, a battery charging quantity, and battery assist timing based on the deterioration state of the fuel cell.

The deterioration state of the fuel cell may be determined as a sufficient stage when the current-voltage performance of the fuel cell is equal to or greater than a first reference performance, determined as a normal stage when the current-voltage performance of the fuel cell is less than the first reference performance and is equal to or greater than a second reference performance, and determined as a deterioration stage when the current-voltage performance of the fuel cell is less than the second reference performance. The determination process may be performed when the current of the fuel cell is included in a preset current range for a predetermined time.

In the variably adjustment process, the battery charging timing may be variably adjusted by changing a targeted state of charge (SOC) and a discharge permissible region based on the deterioration state of the fuel cell. Further, in the variably adjustment process, the battery assist quantity may be variably adjusted by changing a battery assist torque gain and a battery assist gain based on the deterioration state of the fuel cell. The battery charging quantity may be variably adjusted by changing a battery SOC regulation gain based on the deterioration state of the fuel cell. Additionally, the battery assist timing may be variably adjusted by changing a battery assist entry voltage based on the deterioration state of the fuel cell.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
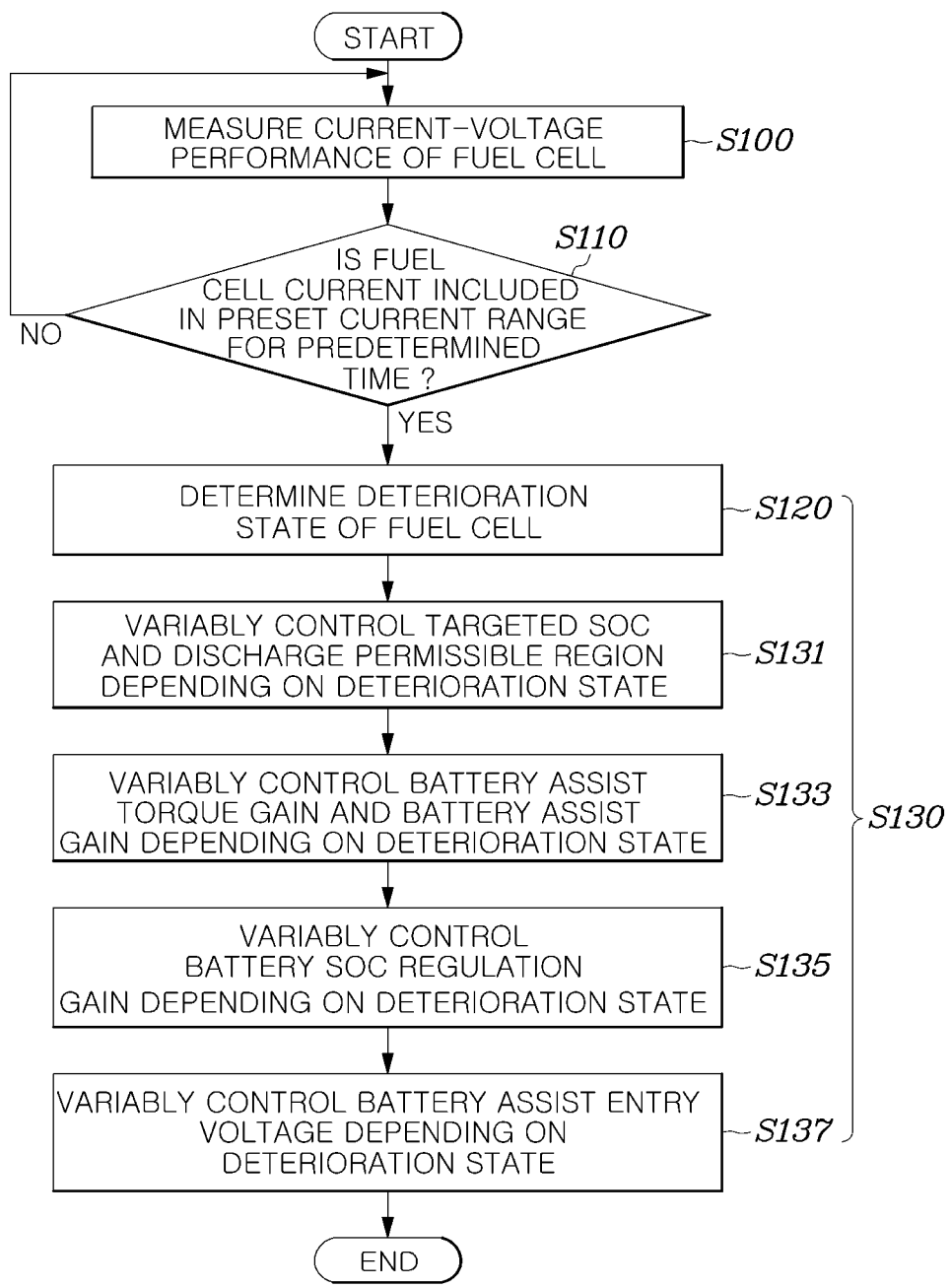
FIG. 1 is an exemplary flow chart illustrating a method for power distribution of a fuel cell hybrid vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a method for power distribution of a fuel cell hybrid vehicle according to an exemplary embodiment of the present invention will be described with reference to the accompanying drawings.

Figure 2:
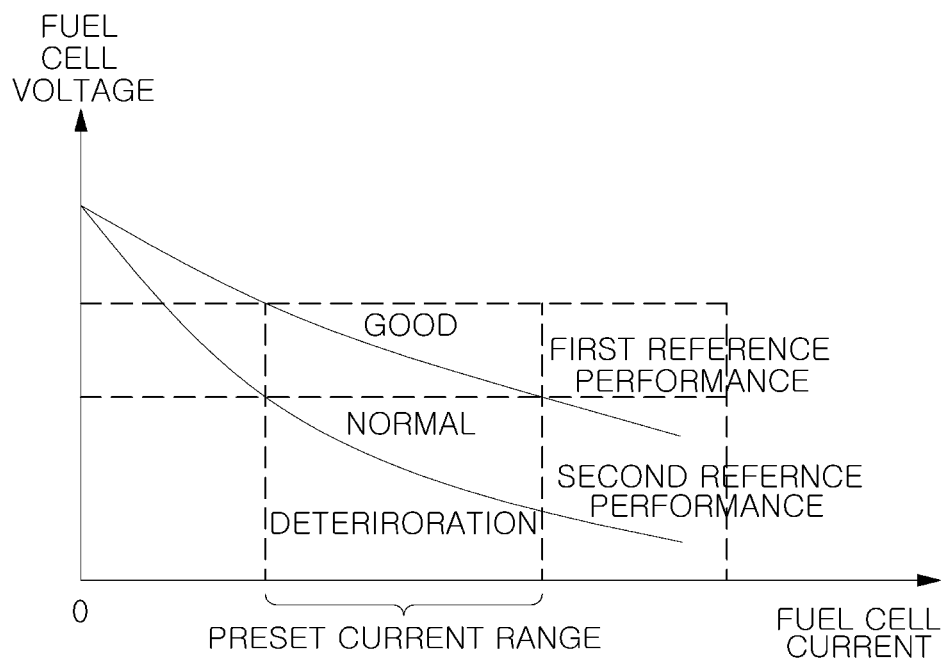
FIG. 2 is an exemplary graph illustrating deterioration states for each current-voltage performance of a fuel cell according to an exemplary embodiment of the present invention.
Figure 3:
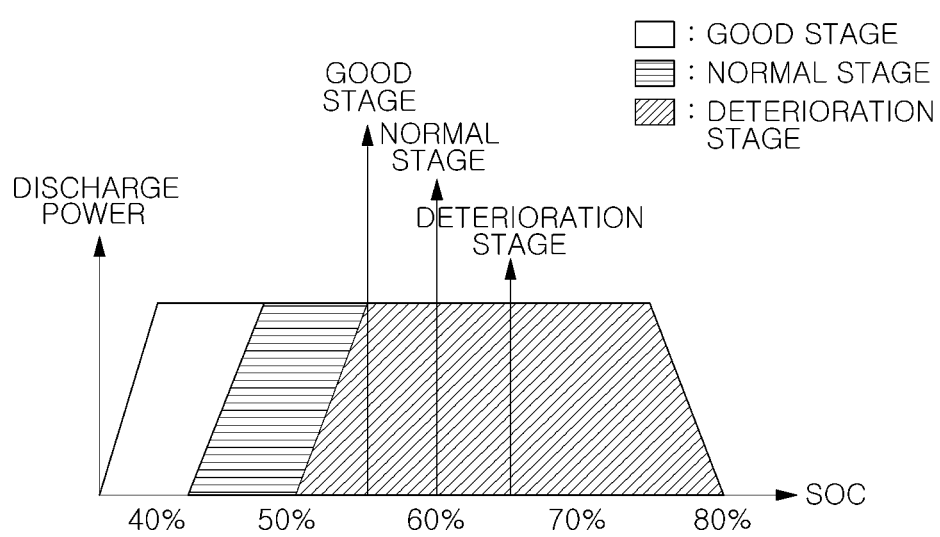
FIG. 3 is an exemplary graph illustrating a targeted SOC and a discharge permissible region for each deterioration state of the fuel cell according to the exemplary embodiment of the present invention.
Figure 4:
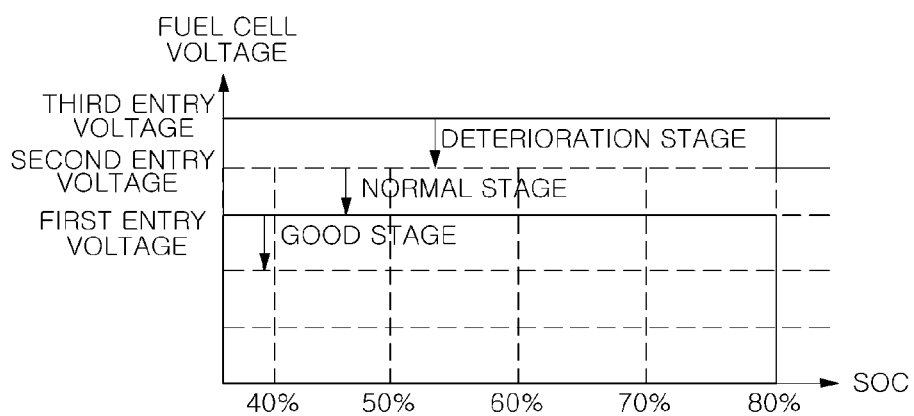
FIG. 4 is an exemplary graph illustrating a battery assist entry voltage for each deterioration state of the fuel cell according to an exemplary embodiment of the present invention.

FIG. 1 is an exemplary flow chart illustrating a method for power distribution of a fuel cell hybrid vehicle according to an exemplary embodiment of the present invention, FIG. 2 is an exemplary graph illustrating deterioration states for each current-voltage performance of a fuel cell according to an exemplary embodiment of the present invention, FIG. 3 is an exemplary graph illustrating a targeted SOC and a discharge permissible region for each deterioration state of the fuel cell according to the exemplary embodiment of the present invention, and FIG. 4 is an exemplary graph illustrating a battery assist entry voltage for each deterioration state of the fuel cell according to an exemplary embodiment of the present invention. The method described herein below may be executed by a controller having a processor and a memory. Additionally, the determination of a deterioration state may be determined using a sensor.

Referring to FIGS. 1 to 4, the method for power distribution of a fuel cell hybrid vehicle may include measuring current-voltage performance of a fuel cell (S100), determining a deterioration state of the fuel cell based on the current-voltage performance of the fuel cell (S120), and after the determination (S120), variably adjusting battery charging timing, a battery assist quantity, a battery charging quantity, and battery assist timing based on the deterioration state of the fuel cell (S130).

In an early state of production, a fuel cell has high current-voltage performance to be able to obtain a desired acceleration performance (e.g., to perform an acceleration performance intention). However, as the deterioration of the fuel cell increases, the current-voltage performance may be reduced, and as a result, even though about the same voltage is input, a low current may be output. In other words, since the output of the fuel cell may be reduced based on the deterioration state of the fuel cell, according to the exemplary embodiment of the present invention, the same desired acceleration performance may be realized by adjusting the power distribution of the fuel cell and the battery based on the deterioration state of the fuel cell.

In particular, the fuel cell hybrid vehicle may generally be driven by a motor with an output of the fuel cell and when the desired acceleration performance is not achieved (e.g., an acceleration intention is not reached) by the output of the fuel cell, a power assist mode in which the fuel cell and the battery simultaneously drive the motor may be performed. According to the exemplary embodiment of the present invention, desired driving power may be realized by variably adjusting power assist mode entry timing, an assist quantity, charging timing of a battery, and a charging quantity based on a deterioration state of the fuel cell.

The deterioration state of the fuel cell may be determined as a sufficient stage when the current-voltage performance of the fuel cell is equal to or greater than a first reference performance, determined as a normal stage when the current-voltage performance of the fuel cell is less than the first reference performance and is equal to or greater than second reference performance, and determined as a deterioration stage when the current-voltage performance of the fuel cell is less than the second reference performance.

The first reference performance may be set to have a current-voltage performance greater than that of the second reference performance. As illustrated in FIG. 2, the deterioration state of the fuel cell may be determined based on a change in the current-voltage performance of the fuel cell. In other words, when the current-voltage performance of the fuel cell is formed to be greater than a curve of the first reference performance, a current to voltage characteristic of the fuel cell may be determined to be sufficient and when the current-voltage performance of the fuel cell is formed to be less than a curve of the second reference performance, a current to voltage characteristic of the fuel cell may be reduced and fuel cell deterioration may be determined. When the current-voltage performance of the fuel cell is formed between the curves of the first reference performance and the second reference performance, a current to voltage characteristic of the fuel cell may be determined to be a normal stage.

Accordingly, the fuel cell may be divided into three deterioration states and the power distribution quantity and the power distribution timing of the fuel cell and the battery may be set variably correspondingly, such that even when the fuel cell deteriorates, the same desired driving output may be realized. In particular, the determination (S120) may be performed when the current of the fuel cell is included in a preset current range for a predetermined time to perform the deterioration determination in the preset current range by setting a section in which the assist of the battery starts as a starting point without determining the deterioration state of the fuel cell at the low output of the fuel cell without the assist of the battery. Further, when a predetermined time lapses, the deterioration stage may be determined and thus the deterioration state of the fuel cell may be more accurately determined (S110). When the current of the fuel cell is not included in a preset current range for a predetermined time, the measuring of the current-voltage performance of the fuel cell (S100) may be repeated.

Meanwhile, according to the exemplary embodiment of the present invention, in the variably adjustment process (S130), the battery charging timing may be variably adjusted by changing the targeted SOC and the discharge permissible region based on the deterioration state of the fuel cell (S131). The targeted SOC is an SOC value of the battery tracked by the battery and when the SOC of the battery is equal to or greater than the targeted SOC, the discharging may be induced and when the SOC of the battery is less than the targeted SOC, the charging may be induced, such that the SOC of the battery may track the targeted SOC. For example, as compared with when the deterioration state of the fuel cell is in the sufficient stage, when the deterioration state of the fuel cell is in the normal stage, the targeted SOC may be set to be greater and as compared with when the deterioration state of the fuel cell is in the normal stage, when the deterioration state of the fuel cell is in the deterioration stage, the targeted SOC may be set to be greater (e.g., may be set to be increased), such that the charging of the battery may start more rapidly.

Further, the discharge permissible region is a region in which the battery may be discharged and as illustrated in FIG. 3, as compared with when the deterioration state of the fuel cell is in the sufficient stage, when the deterioration state of the fuel cell is in the normal stage, a reference lower limit of the discharge permissible region may be set to be greater (e.g., may be increased) and as compared with when the deterioration state of the fuel cell is in the normal stage, when the deterioration state of the fuel cell is in the deterioration state, the reference lower limit of the discharge permissible region may be set to be greater. In other words, in response to determining that the fuel cell deteriorates, the reference lower limit of the discharge permissible region of the battery may be set to be greater (e.g., may be increased) and thus the charging of the battery may be performed more rapidly.

Further, in the variably adjustment process (S130), the battery assist quantity may be variably adjusted by changing a battery assist torque gain and a battery assist gain based on the deterioration state of the fuel cell (S133). The battery assist torque gain may be a gain proportional to a driver request torque and as the value is increased, the battery assist quantity may be increased. In addition, the battery assist gain may be a gain for the battery assist quantity and as the value is increased, the battery assist quantity may be increased. For example, as compared with when the deterioration state of the fuel cell is in the sufficient stage, when the deterioration state of the fuel cell is in the normal stage, the battery assist torque gain and the battery assist gain value may be set to be greater (e.g., to be increased) and as compared with when the deterioration state of the fuel cell is in the normal stage, when the deterioration state of the fuel cell is the deterioration stage, the battery assist torque gain and the battery assist gain value may be set to be greater (e.g., to be increased). In other words, in response to determining that the fuel cell deteriorates, the battery assist quantity may be set to be greater (e.g., to be increased).

Further, in the variably adjustment process (S130), the battery charging quantity may be variably adjusted by changing a battery SOC regulation gain based on the deterioration state of the fuel cell (S135). The battery SOC regulation gain may be a high voltage battery charging gain for estimating the targeted SOC and as the value is increased, the battery charging quantity may be increased. For example, as compared with when the deterioration state of the fuel cell is in the sufficient stage, when the deterioration state of the fuel cell is in the normal stage, the battery SOC regulation gain may be set to be increased and as compared with when the deterioration state of the fuel cell is in the normal stage, when the deterioration state of the fuel cell is in the deterioration stage, the battery SOC regulation gain may be set to be increased. In other words, in response to determining that the fuel cell deteriorates, the battery charging quantity may be set to be increased and thus the charging of the battery may be more rapidly performed, thereby increasing the charging efficiency.

Moreover, in the variably adjustment process (S130), the battery assist timing may be variably adjusted by changing a battery assist entry voltage based on the deterioration state of the fuel cell (S137). The battery assist entry voltage may be one of the conditions to enter the power assist mode in which the fuel cell and the battery simultaneously drive the motor and when a fuel cell voltage is set to be equal to or less than a predetermined voltage, the power assist mode may be performed. The predetermined voltage may be set as the battery assist entry voltage.

In particular, when the deterioration state of the fuel cell is in the normal stage, the battery assist entry voltage may be set to be decreased and when the deterioration state of the fuel cell is in the deterioration stage, the battery assist entry voltage may be set to be decreased. As illustrated in FIG. 4, in the case of the good stage, the battery assist entry voltage may be set as a first entry voltage, in the case of the normal stage, the battery assist entry voltage may be set as a second entry voltage, in the case of the deterioration stage, the battery assist entry voltage may be set as a third entry voltage, and thus when the deterioration state of the fuel cell is substantial, the battery assist timing may be set to be more rapid, thereby maintaining the driving power of the fuel cell hybrid vehicle.

According to the method for power distribution of a fuel cell hybrid vehicle configured as described above, it may be possible to improve marketability of the vehicle by realizing a desired acceleration performance even though the fuel cell deteriorates.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A method for power distribution of a fuel cell hybrid vehicle, comprising:
   measuring, by a controller, current-voltage performance of a fuel cell;
   determining, by the controller, deterioration state of the fuel cell based on the current-voltage performance of the fuel cell; and
   after the determination, variably adjusting, by the controller, battery charging timing, a battery assist quantity, a battery charging quantity, and battery assist timing based on the deterioration state of the fuel cell.

2. The method of claim 1, wherein the deterioration state of the fuel cell is determined as a sufficient stage when the current-voltage performance of the fuel cell is equal to or greater than first reference performance, determined as a normal stage when the current-voltage performance of the fuel cell is less than the first reference performance and is equal to or greater than second reference performance, and determined as a deterioration stage when the current-voltage performance of the fuel cell is less than the second reference performance.

3. The method of claim 2, wherein the determination is performed when a current of the fuel cell is included in a preset current range for a predetermined time.

4. The method of claim 1, wherein in the variably adjustment process, the battery charging timing is variably adjusted by changing a targeted state of charge (SOC) and a discharge permissible region based on the deterioration state of the fuel cell.

5. The method of claim 1, wherein in the variably adjustment process, the battery assist quantity is variably adjusted by changing a battery assist torque gain and a battery assist gain based on the deterioration state of the fuel cell.

6. The method of claim 1, wherein in the variably adjustment process, the battery charging quantity is variably adjusted by changing a battery state of charge (SOC) regulation gain based on the deterioration state of the fuel cell.

7. The method of claim 1, wherein in the variably adjustment process, the battery assist timing is variably adjusted by changing a battery assist entry voltage based on the deterioration state of the fuel cell.

8. A system for power distribution of a fuel cell hybrid vehicle, comprising:
   a memory configured to store program instructions; and
   a processor configured to execute the program instructions, the program instructions when executed configured to:
      measure current-voltage performance of a fuel cell;
      determine deterioration state of the fuel cell based on the current-voltage performance of the fuel cell; and
      after the determination variably adjust battery charging timing, a battery assist quantity, a battery charging quantity, and battery assist timing based on the deterioration state of the fuel cell.

9. The system of claim 8, wherein the deterioration state of the fuel cell is determined as a sufficient stage when the current-voltage performance of the fuel cell is equal to or greater than first reference performance, determined as a normal stage when the current-voltage performance of the fuel cell is less than the first reference performance and is equal to or greater than second reference performance, and determined as a deterioration stage when the current-voltage performance of the fuel cell is less than the second reference performance.

10. The system of claim 9, wherein the determination is performed when a current of the fuel cell is included in a preset current range for a predetermined time.

11. The system of claim 8, wherein the program instructions when executed are further configured to:
   variably adjust the battery charging timing by changing a targeted state of charge (SOC) and a discharge permissible region based on the deterioration state of the fuel cell.

12. The system of claim 8, wherein the program instructions when executed are further configured to:
   variably adjust the battery assist quantity by changing a battery assist torque gain and a battery assist gain based on the deterioration state of the fuel cell.

13. The system of claim 8, wherein the program instructions when executed are further configured to:
   variably adjust the battery charging quantity by changing a battery state of charge (SOC) regulation gain based on the deterioration state of the fuel cell.

14. The system of claim 8, wherein the program instructions when executed are further configured to:
   variably adjust the battery assist timing by changing a battery assist entry voltage based on the deterioration state of the fuel cell.

* * * * *